July 9, 1946.    U. LAMM    2,403,891
LOAD CURRENT CONTROL
Filed Sept. 23, 1942
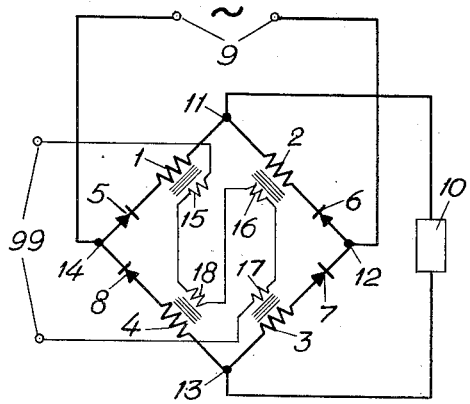
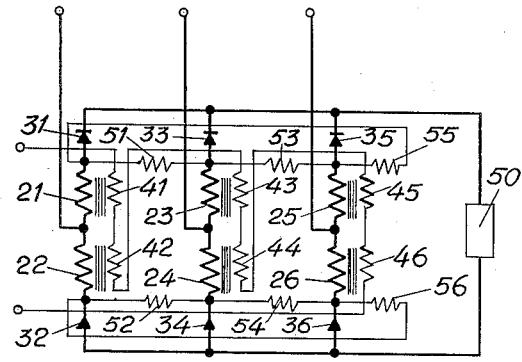
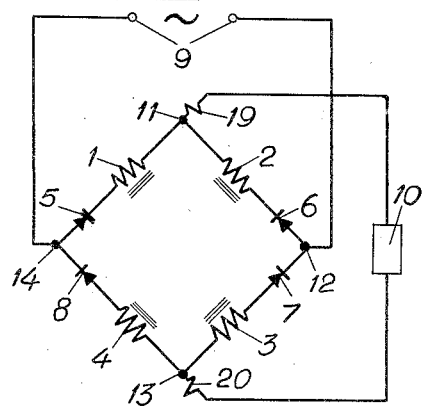
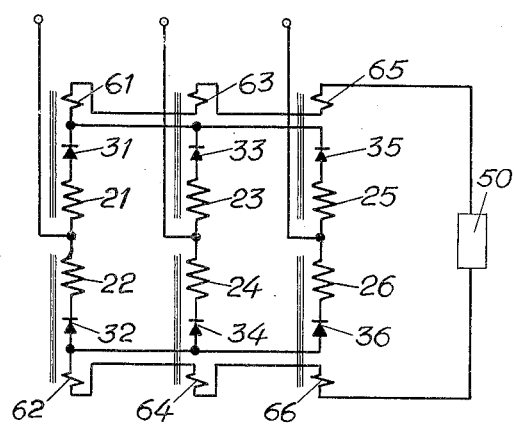
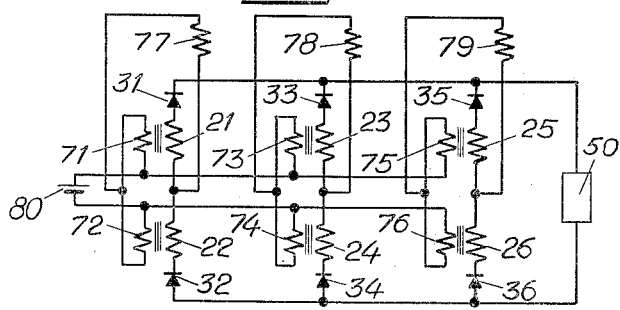
INVENTOR.
Uno Lamm
BY
Wm. Wallace White
Attorney Patented July 9, 1946

2,403,891

UNITED STATES PATENT OFFICE 2,403,891

LOAD CURRENT CONTROL

Uno Lamm, Ludvika, Sweden, assignor to Allmänna Svenska Elektriska Aktiebolaget, Vasteras, Sweden, a Swedish corporation Application September 23, 1942, Serial No. 459,421
In Sweden October 13, 1941

3 Claims. (Cl. 175—363)

The present invention relates to a device for influencing a current in dependence on another current, for the purpose of regulation or the like, by means of a direct current saturated inductance having an independent control magnetisation and a self-magnetisation by a direct current traversing the alternating current windings. According to the invention, a rectifier element is connected between each alternating current terminal and each direct current terminal of the main winding in series with a winding element thereof for producing the self-magnetisation.

Five different forms of the invention are illustrated in Figs. 1-5 of the accompanying drawing which show diagrams of connections.

Fig. 1 shows a diagram of a direct current saturated inductance fed by a single phase alternating current. It consists of four winding elements 1, 2, 3, 4 connected in tetragon, the elements of two opposite sides of which may be wound on common iron cores. Thus, the elements 1 and 3 may be wound on one core and 2 and 4 on another.

In each side of the tetragon, there is further connected a rectifier cell 5, 6, 7, 8 respectively in such manner as to form the so-called Graetz connection which is well-known per se. Two corners 12, 14 of the tetragon are connected to the terminals 9 of an alternating current source, while the two remaining corners 11, 13 form the direct current terminals, between which a load 10, such as a coil of a regulator or a storage battery, may be connected. The direct current terminals are thus equipotential to the fundamental wave of the alternating current.

If the rectifier cells 5-8 were omitted and the load 10 replaced by a direct current source which furnished a current in the same direction as that permitted by the rectifiers, a common spare-connected single phase direct current saturated inductance would be obtained. The alternating current through each inductance element would practically follow the direct current as regards value and curve shape, only half waves of the same direction as the direct current being admitted, while the oppositely directed half waves would be reduced to very low current values by the inductance elements. Practically, the alternating current in each element would thus be transformed into a pulsating direct current. In this respect, no substantial difference is caused by the introduction of the rectifier cells 5-8 which only admit pulsating direct currents. The effect of these cells is to make the use of a separate direct current source of the same current capacity as the alternating current source unnecessary. When the rectifier cells are connected as shown, it is only necessary to supply to each inductance element an additional magneto-motive force of the same relative order of magnitude as the magnetizing current of a transformer as compared with the load current, attention being also paid to the reverse current in the rectifier cells. Such an additional magnetomotive force may be supplied by an additional winding 15, 16, 17, 18 on each inductance element, which windings are connected in series between a pair of direct current terminals 99. The current through these windings can be independently controlled, for instance by an automatic regulator, and defines the current through the load 10.

Fig. 2 shows an example of the invention applied to a three-phase connection. The inductance elements are here designated by 21—26, the rectifier cells connected in series therewith by 31—36, and the windings carrying the independent controlling current by 41—46. The load influenced by the controlled direct current is designated by 50. Further, this figure shows an additional load in the shape of delta connected inductances 51, 53, 55 and 52, 54, 56, the terminals of which are connected between the inductance elements 21—26 and the rectifier elements 31—36, thus in parallel to the direct current load, although on the alternating current side. If, for instance, the direct current load consists of a storage battery and this becomes fully charged, no further current should be supplied thereto. If, however, the load on the inductance elements sinks entirely down to zero, the said elements lose their property to absorb a voltage, as the load current does not amount to the value of the magnetizing current. The consequence is that the voltage impressed on the battery may rise too much. By the additional load, this possibility is eliminated, and as the said load is connected on the alternating current side, the power absorbed thereby will be practically only a reactive one.

The number of inductances for the additional load may be reduced to three if one of them is connected with one terminal between 21 and 31 and with the other terminal between 24 and 34 and the remaining ones in a corresponding way. As these points are not equipotential for the direct current, blocking condensers should then be connected in series with the load inductances, said condensers having a lower impedance than the inductances at the frequency of the alternating current.

It may sometimes be desirable to increase or reduce the self-magnetisation as compared with that obtained by the connections shown in Fig. 1 or 2. Some examples of connections for this purpose are shown in Figs. 3–5.

Fig. 3 shows a single phase direct current saturated inductance of the same type as in Fig. 1, but with an increased self-magnetisation, which may serve to increase the sensitivity of the inductance for the independent control magnetisation or even make it unstable so as to make the traversing alternating current vary suddenly between low and high values. The numerals 1—14 designate corresponding members in Fig. 3 and in Fig. 1, while the independent magnetizing windings are omitted in Fig. 3 for the purpose of simplification. On each core, between a direct current terminal and the direct current load, a winding 19, 20 respectively is mounted for supplying the additional self-magnetisation.

Fig. 4 shows a three-phase connection corresponding to Fig. 3. The numerals 21—26, 31—36 and 50 designate corresponding members in Figs. 4 and 2. The means for supplying the control magnetisation and for the additional load may be the same in Fig. 4 as in Fig. 2 but have been omitted to simplify the figure. As there are six separate magnet cores in Fig. 4, three windings 61, 63, 65 and 62, 64, 66, respectively, are connected in series between each direct current terminal and the load 50. The manner of operation will be analogous to that of Fig. 3.

If, in a single-phase connection, the self-magnetisation shall be reduced instead of increased, Fig. 3 may be modified in such manner that the rectifier elements are placed at the direct current terminals instead of at the alternating current terminals and the winding is extended beyond the latter ones so that the extensions are not traversed by the direct current. An example of a three-phase connection for the same purpose is shown in Fig. 5. Each core in this figure carries an additional alternating current winding 71—76 which is series-connected with the ordinary winding 21—26, the current source 77—79 preferably being connected between the outer terminals of the windings. Between the two neutral points of the windings 71—76, there is connected a direct current source 80 furnishing the independent control magnetisation. Thus in this case, a separate winding for this purpose, corresponding to the windings 41—46 in Fig. 2, can be dispensed with. In view of the fact that the windings 71—76 have no rectifier elements, the self-magnetizing direct current ampereturns will be essentially less than the alternating current ampereturns, which in some cases may be desirable for obtaining a more stable regulation than with a hundred percent self-magnetisation. Additional load inductances of the same type as the inductances 51—56 may of course be introduced also in the connection according to Fig. 5.

Instead of connecting a load between the direct current terminals as illustrated, the latter may be directly short-circuited, possibly through a smoothening reactor, and a load may be connected in circuit on the other side of the alternating current source, counted from the direct current saturated inductance. Separate rectifiers may be connected between this load and the alternating current source.

The connection described may also be simplified in such manner that rectifier elements are connected in series only with the inductance elements lying between the alternating current terminals and one of the direct current terminals, while only inductance elements without any rectifier elements lie between the alternating current terminals and the other direct current terminals. Thus for instance, the rectifier elements 32, 34, and 36 in Fig. 2 may be omitted. The action of the self-magnetisation will, however, in this case be inferior to that obtained by the connections illustrated.

I claim as my invention:

1. Means for influencing a load current in dependence on a controlling direct current comprising a number of iron cores, windings thereon traversed by the controlling current, other windings on said cores traversed by said load current connected to terminals of an alternating current source and interconnected to form direct current terminals equipotential to the fundamental wave of the alternating current, a rectifier element connected between each direct current terminal and each alternating current terminal in series with one of said interconnected windings, and a winding on each of said cores traversed by the rectified load current.

2. Means for influencing a polyphase load current in dependence on a controlling direct current comprising a number of individual iron cores equal to twice the phase number, windings thereon traversed by the controlling current, other windings on said cores traversed by said load current connected to terminals of a polyphase alternating current source and interconnected to form direct current terminals equipotential to the fundamental waves of the polyphase current, a rectifier element connected between at least one of said direct current terminals and each alternating current terminal in series with one of said interconnected windings, additional turns on each of said cores traversed by the rectified current, and a load element connected in series with said interconnected windings.

3. Means for influencing a polyphase load current in dependence on a controlling direct current comprising a number of individual iron cores equal to twice the phase number, windings thereon traversed by the controlling current, other windings on said cores traversed by said load current connected to terminals of a polyphase alternating current source and interconnected to form direct current terminals equipotential to the fundamental wave of the polyphase current, a rectifier element connected between at least one of said direct current terminals and each alternating current terminal in series with one of said interconnected windings, a load element connected between said direct current terminals, and inductive load elements connected in series with said interconnected windings.

UNO LAMM.